United States Patent [19]

Koizumi

[11] 4,276,587

[45] Jun. 30, 1981

[54] DC TO DC CONVERTER

[75] Inventor: Akio Koizumi, Tokyo, Japan

[73] Assignee: Sony Corporation, Tokyo, Japan

[21] Appl. No.: 934,261

[22] Filed: Aug. 16, 1978

Related U.S. Application Data

[63] Continuation of Ser. No. 760,457, Jan. 18, 1977, abandoned.

[30] Foreign Application Priority Data

Jan. 23, 1976 [JP] Japan .................................. 6769/76

[51] Int. Cl.$^2$ ............................................. H02M 3/32
[52] U.S. Cl. ...................................... 363/26; 323/247; 323/272
[58] Field of Search .................... 363/20, 21, 24, 25, 363/26, 28, 79, 80, 81, 89, 97, 101, 134; 323/17, 23, 25, DIG. 1, 45

[56] References Cited

U.S. PATENT DOCUMENTS

| | | | |
|---|---|---|---|
| 3,443,194 | 5/1969 | Cielo | 323/DIG. 1 |
| 3,657,631 | 4/1972 | Martens | 363/26 |
| 3,701,937 | 10/1972 | Combs | 363/25 |
| 3,745,443 | 7/1973 | Weil | 323/17 |
| 3,913,000 | 10/1975 | Cardwell, Jr. | 323/17 |
| 3,916,283 | 10/1975 | Burrows | 363/26 |
| 3,925,715 | 12/1975 | Venable | 363/26 |
| 3,984,799 | 10/1976 | Fletcher et al. | 323/17 |
| 4,030,024 | 6/1977 | Chambers et al. | 323/17 |
| 4,031,453 | 6/1977 | Teulling | 363/20 |
| 4,037,271 | 7/1977 | Keller | 363/21 |

Primary Examiner—J. D. Miller
Assistant Examiner—L. C. Schroeder
Attorney, Agent, or Firm—Hill, Van Santen, Steadman, Chiara & Simpson

[57] ABSTRACT

DC to DC converter having DC input and DC output, a first switching element to repetitively connect and disconnect the DC input to an inductance winding connected through the first switching element. A source of pulse width modulated signal provides a control signal based on the detected output voltage of the converter. A second detector which detects a variation in the output load. A second switching element which controls the inductance of the winding is actuated based on the second detected signal.

7 Claims, 4 Drawing Figures

DC TO DC CONVERTER

This is a continuation, of application Ser. No. 760,457, filed Jan. 18, 1977 now abandoned.

BACKGROUND OF THE INVENTION

1. Field of the Invention

This invention relates generally to a power supply circuit and more particularly to a power supply circuit of a switching type.

2. Description of the Prior Art

A power supply circuit of a switching system is well known in the art. In a prior art power supply circuit, a commercial AC voltage is supplied through a power plug and a power switch to a rectifier, and then rectified and smoothed as a DC voltage. This DC voltage is supplied to a series connection of the primary winding of a transformer and a switching transistor which transistor is supplied with PWM (pulse width modulated) signal from a PWM modulator and then switched ON and OFF. Thus, an AC voltage is induced on the secondary winding of the transformer and then fed to a rectifier to be rectified as a desired DC voltage which is delivered to an output terminal.

The output voltage terminal is detected by a detecting circuit and the detected output is fed through a coupler for isolation and separation such as a photocoupler to the modulator as a modulation signal. While, a pulse from an oscillator is applied to the modulator as its carrier. Thus, the width of the PWM pulse from the modulator is varied in response to the voltage at the output terminal and hence the DC voltage at the output terminal is stabilized at a constant value.

Under the following assumption that
$V_i$: output voltage of first rectifier
$D$: duty ratio of PWM pulse
$T_p$: period of PWM pulse
$R_L$: load connected to output terminal
$l_1$: inductance of primary winding of transformer,
the output voltage $V_o$ at the output terminal is expressed as follows:

$$V_o = V_i \cdot D \sqrt{\frac{R_L \cdot T_p}{2l_1}}$$

The maximum output power $P_o$ is expressed as follows:

$$P_o = \frac{V_o^2}{R_L} = \frac{V_i^2 \cdot D^2 \cdot T_p}{2l_1} \quad (1)$$

Thus, the output voltage $V_o$ can be made of a constant value by varying the duty ratio $D$ of the PWM pulse.

In this case, however, the period $T_p$ is determined by the characteristics of the switching transistor and the inductance $l_1$ of the primary winding is determined by the voltage $V_i$ and maximum output power $P_o$. In this case, the energy stored in the primary winding during the period within which the switching transistor is in ON-state is derived from the secondary winding during the period within which the transistor is in OFF-state, so that in general the duty ratio $D$ is limited to $0.5 \sim 0.7$.

Accordingly, with the above prior art power supply circuit, the output voltage $V_o$ can not be sufficiently stabilized for wide variation of loads.

For this reason, in the art a dummy load is connected to the output terminal of the power supply circuit in addition to the real load to reduce a range of an apparent load variation and to stabilize the output voltage $V_o$. This method, however, causes lowering of efficiency and becomes ineffective for a wide range of load variation.

A prior art disclosure by way of example is found in U.S. Pat. No. 3,701,937.

OBJECTS AND SUMMARY OF THE INVENTION

It is an object of the invention to provide a power supply circuit high in efficiency.

It is another object of the invention to provide a power supply circuit which can produce a stable DC voltage at its output terminal for a large variation of loads.

It is a further object of the invention to provide a power supply circuit which can always produce the maximum output power even if a load connected to its output terminal is varied.

It is a still further object of the invention to provide a power supply circuit which can achieve the effects the same as those set forth above by varying the inductance of an inductive element in response to the variation of a load as reflected by the DC current in the output circuit and the voltage at the output terminal.

It is a yet another object of the invention to provide a power supply circuit which is simple in circuit construction but can produce the maximum power and a stable DC output voltage even if a load is changed in magnitude.

According to an aspect of the invention, a power supply circuit is provided which comprises a DC voltage source, inductive means supplied with a DC voltage from said DC voltage source, switching means connected to said inductive means, means for converting an AC voltage produced in said inductive means by said switching means into a DC voltage, an output terminal connected to said converting means, means for detecting a DC voltage delivered to said output terminal, a modulating circuit for producing a modulated signal in accordance with an output signal from said detecting means, means for applying the modulated signal to said switching means, means for detecting the magnitude of a load connected to said output terminal, and means for changing the inductance of said inductive means in accordance with an output of said second detecting means. The other objects, features and advantages of the invention will become apparent from the following description taken in conjunction with the accompanying drawings through which like numerals designate like elements.

DESCRIPTION OF THE PREFERRED EMBODIMENTS

Figure 1:
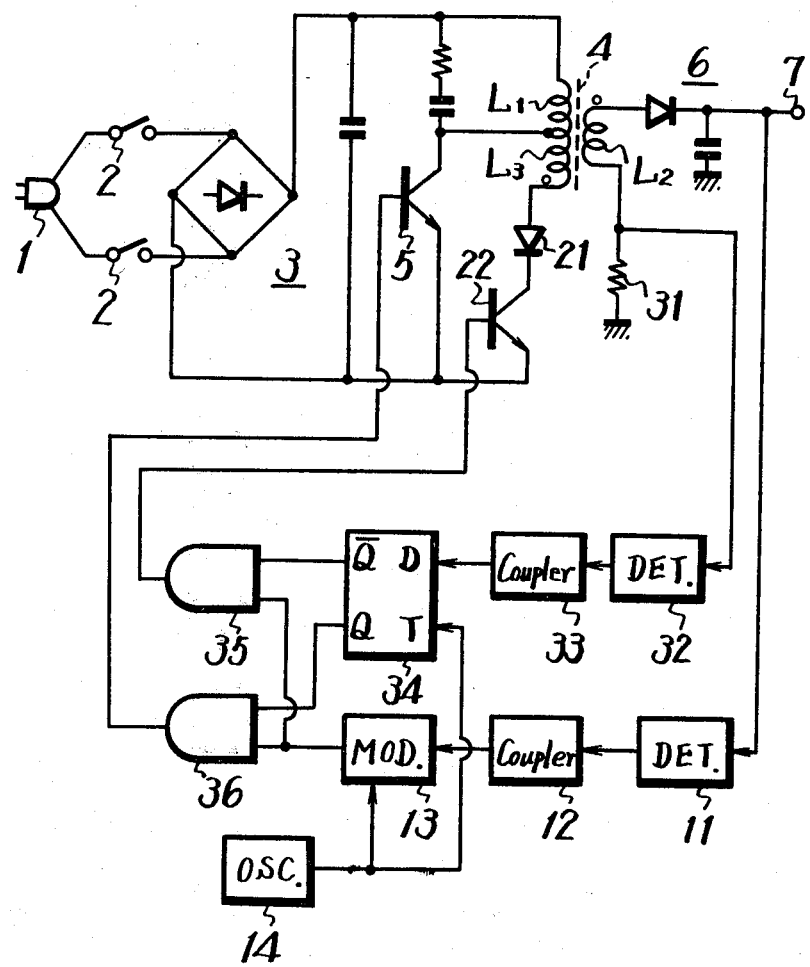
FIG. 1 is a circuit diagram showing an example of the power supply circuits according to the invention.

A first embodiment of the power supply circuit according to the present invention will be described with reference to FIG. 1. In the embodiment shown in FIG. 1, a commercial AC voltage is supplied through a power plug 1 and power switches 2 to a full-wave rectifying circuit or rectifier 3 and converted thereby to a smoothed DC voltage. This DC voltage is fed to a series connection of a primary winding $L_1$ of a transformer 4, which serves as an inductive means, and a transistor 5 acting as a first switching means. The transistor 5 is switched ON and OFF with a pulsated modulated signal from a modulating circuit or modulator 13 which will be described later. The transformer 4 includes an output winding $L_2$ and a voltage induced across the winding $L_2$ is fed to a rectifying circuit or rectifier 6 and then converted thereby to a DC voltage which is delivered to an output terminal 7.

The DC voltage at the output terminal 7 is fed to a detecting circuit or detector 11 and detected. The detected output from the detector 11 is applied through a coupler such as a photo-coupler 12 for isolation and separation to the modulator 13 as a modulation signal. The modulator 13 is supplied with a pulse from an oscillation circuit or oscillator 14 as a carrier. Thus, a PWM (pulse width modulated) signal is fed from the modulator 13 to the base of the transistor 5. As a result, the width of the pulse from the modulator 13 is varied in response to the voltage at the output terminal 7, and when a load (not shown) connected to the terminal 7 is constant, the output voltage at the terminal 7 is kept constant.

The circuit construction set forth above is, however, well known in the art.

In the power supply circuit of the invention shown in FIG. 1, a winding $L_3$ is connected in series to the winding $L_1$, and a series connection of a diode 21 and a transistor 22, which serves as a second switching means, is connected in series to the winding $L_3$ but parallel to the transistor 5. Further, a resistor 31 of a small resistance is connected between one end of the output winding $L_2$ and the ground for current detection, and a voltage drop across the resistor 31 is fed to a detecting circuit or detector 32. This detector 32 produces a detected output which is "0" when the voltage drop across the resistor 31 or output current from the output terminal 7 is lower than a predetermined value $I_{TH}$ but "1" when the same is higher than the predetermined value $I_{TH}$. The detected output is supplied through a coupler 33 to a control circuit, for example, to a D-input terminal of a D flip-flop circuit 34 which is also supplied with, at its T-input terminal, the pulse from the oscillator 14. An output appearing at a $\overline{Q}$-output terminal of the flip-flop circuit 34 is fed to one input terminal of an AND-circuit 35 which is supplied, at its other input terminal, with the PWM pulse from the modulator 13. The output from the AND-circuit 35 is supplied to the base of the transistor 22. An output appearing at a Q-output terminal of the flip-flop circuit 34 is supplied to one input terminal of an AND-circuit 36 whose other input terminal is supplied with the PWM pulse from the modulator 13. The output from the AND-circuit 36 is applied to the base of the transistor 5.

With the power supply circuit of the invention described as above in connection with FIG. 1, if the load current at the output terminal 7 is low, as determined by the voltage across resistor 31 in the output circuit as detected by detector 32 the output current at the terminal 7 decreases. When the output current decreases so that it is lower than the threshold level $I_{TH}$ of the detector 32, the detected output therefrom becomes "0". Thus, the output at the Q-terminal of the flip-flop circuit 34 becomes "0" in synchronization with the pulse from the oscillator 14, so that the transistor 5 becomes OFF. At this time, however, the output at the $\overline{Q}$-terminal of the flip-flop circuit 34 becomes "1", so that the PWM pulse from the modulator 13 is supplied through the AND-circuit 35 to the transistor 22. Accordingly, the transistor 22 carries out the switching and hence the output voltage $V_o$ is obtained at the output terminal 7.

In this case, the voltage $V_i$ from the rectifier 3 is fed to the series connection of the windings $L_1$ and $L_3$, so that the maximum output power $P_o$ can be expressed as follows:

$$P_o = \frac{V_i^2 \cdot D^2 \cdot T_p}{2(l_1 + l_3)} \qquad (2)$$

where $l_3$ is the inductance of the winding $L_3$.

Accordingly, if the inductances $l_1$ and $l_3$ of the windings $L_1$ and $L_3$ are selected predeterminedly, a sufficiently stable DC voltage $V_o$ can be produced for fluctuation of a load even when the load is light.

In the case where the load current at the terminal 7 is relatively large, the voltage drop across resistor 31 in the output circuit at the terminal 70 is increased at the terminal 7 is increased. When the output current becomes higher than the threshold level $I_{TH}$ of the detector 32, the detected output thereof becomes "1". Thus, the output at the $\overline{Q}$-terminal of the flip-flop circuit 34 becomes "0" in synchronism with the pulse from the oscillator 14. As a result, the output of the AND-circuit 35 becomes "0" and hence the transistor 22 stops its switching operation. At this time, however, the output at the Q-terminal of the flip-flop circuit 34 becomes "1", so that the PWM pulse from the modulator 13 is fed through the AND-circuit 36 to the transistor 5. Thus, the transistor 5 carries out the switching and hence the output voltage $V_o$ is obtained at the terminal 7.

In the example of FIG. 1, the diode 21 serves to prevent a voltage from being applied to the transistor 22 in reverse direction when the other transistor 5 is carrying out its switching.

In this case, the voltage $V_i$ from the rectifier 3 is supplied to only the winding $L_1$ and the inductance of the winding becomes small as compared with the case where the load is light. Therefore, as may be apparent from the expressions (1) and (2), the maximum output power $P_o$ obtained at the output terminal 7 becomes great. That is, even if a large output is derived, the DC voltage at the terminal 7 is stabilized. Hence, in the case that the load is heavy, the DC voltage $V_o$ can be obtained which is sufficiently stable for the fluctuation of the load.

As described above, according to the present invention, even if the load is varied widely, the output voltage $V_o$ can be sufficiently stabilized. In this case, the load variation is compensated by changing the inductances of the windings $L_1$ and $L_2$, so that any lowering of efficiency can be avoided.

In the example shown in FIG. 1, the windings $L_1$ and $L_3$ are connected in series, but it is possible to connect the windings $L_1$ and $L_3$ in parallel, as will now be described with reference to FIG. 2.

Figure 2:
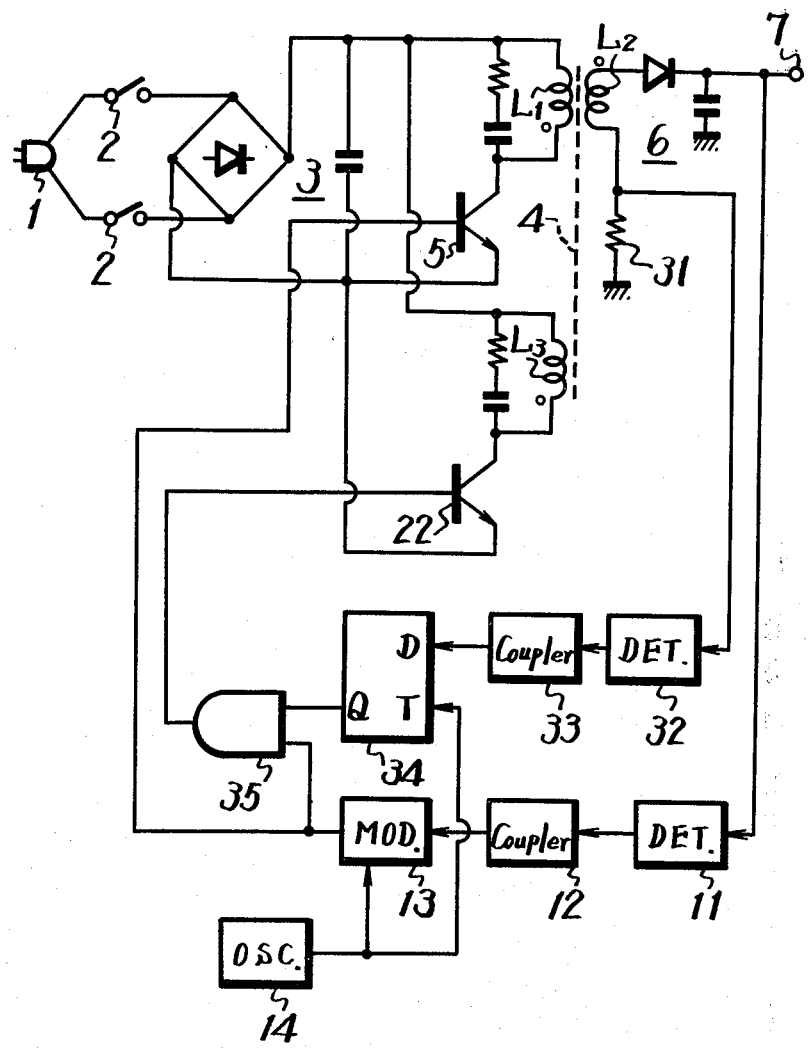
FIG. 2 is a circuit diagram showing a second example of the power supply circuits of the invention.

FIG. 2 is a second embodiment of the power supply circuits of the invention in which reference numerals the same as those used in FIG. 1 designate the same elements. In the example of FIG. 2, the windings $L_1$ and $L_3$ are connected in parallel with each other and the other circuit construction is substantially the same as that of FIG. 1 except for a few elements which render no substantial difference.

With the power supply circuit of the invention shown in FIG. 2, when the load is light, only the transistor 5 achieves the switching operation to produce the maximum output power $P_o$ expressed by the equation (1); while when the load is heavy, the output at the Q-terminal of the flip-flop circuit 34 becomes "1" and hence the transistor 22 achieves the switching operation. Thus, the maximum output power $P_o$ which is expressed as follows can be produced.

$$P_o = \frac{4V_i \cdot D^2 \cdot T_p}{\left(\sqrt{l_1} + \sqrt{l_3}\right)^2} \quad (3)$$

Figure 3:
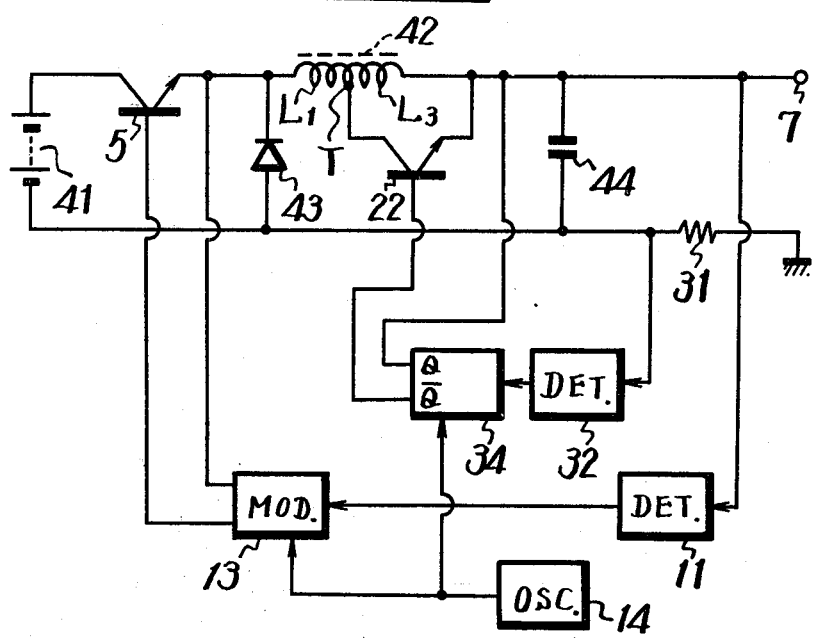
FIG. 3 is a circuit diagram showing a third example of the power supply circuits of the invention.
Figure 4:
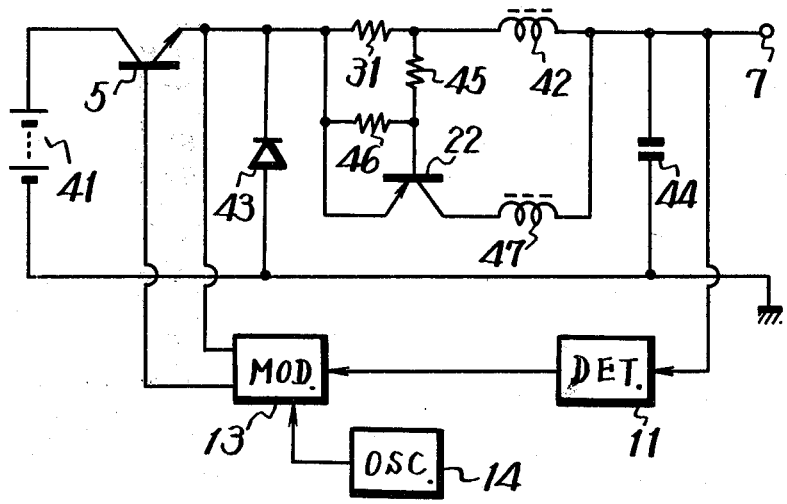
FIG. 4 is a circuit diagram showing a fourth example of the power supply circuits of the invention.

FIGS. 3 and 4 show other examples of the invention in which the idea of the invention is employed in the power supply circuits of a chopper system and like references designate like elements in the foregoing examples.

In the example of FIG. 3, between a DC voltage source such as a battery 41 and an output terminal 7, there are connected in series a transistor 5 and a choke coil 42 (which corresponds to the windings $L_1$ and $L_3$ of the former examples) and also there are connected in parallel a diode 43 and a capacitor 44, respectively. The transistor 22 is connected in parallel across the portion $L_3$ of the choke coil 42 and is thus connected between a tap T of the choke coil 42 and the output terminal 7.

With the power supply circuit of the invention shown in FIG. 3, when the load is heavy, the output at the $\overline{Q}$-terminal of the flip-flop circuit 34 is fed to the base of the transistor 22 to make it OFF, while when the load is light, the transistor 22 becomes ON and the inductance of the choke coil 42 becomes small. As set forth above, in the case the load is heavy, the transistor 22 is made OFF and the inductance of the choke coil 42 becomes great. Thus, a stable output voltage $V_o$ can be produced by the power supply circuit even if the load is varied largely.

With the example of FIG. 4, if the load is light, a voltage drop across a resistor 31 is small and hence a divided voltage by resistors 45 and 46 is small. Thus, the transistor 22 is OFF. While, if the load is heavy, since the divided voltage by the resistors 45 and 46 increases, the transistor 22 becomes ON. Thus, a choke coil 47 is connected in parallel to a choke coil 42. Accordingly, even if the load is varied largely, a stable output voltage $V_o$ can be produced.

It will be apparent that many modifications and variations could be effected by one skilled in the art without departing from the spirit and scope of the novel concepts of the present invention, so that the scope of the invention should be determined by the appended claims.

I claim as my invention:

1. A power supply circuit comprising, a DC voltage source, a pair of input terminals connected to said DC voltage source, an output terminal, first and second inductors, a first switching means connected in series with said first and second inductors between said output terminal and one of said pair of input terminals, a second switching means connected in parallel with said second inductor, a resistor connected between the second one of said pair of input terminals and a reference potential, a first detector connected to said output terminal, an oscillator, a modulator receiving inputs from said first detector and said oscillator and supplying a switching signal to said first switching means, a second detector connected to said resistor, and a flip-flop circuit receiving inputs from said oscillator and said second detector and supplying a switching signal to said second switching means.

2. A power supply circuit according to claim 1, wherein said first and second switching means are transistors.

3. A power supply circuit comprising, a DC voltage source, first and second input terminals connected to said DC voltage source, an output terminal, first and second inductors, a first resistor, a first switching means connected in series with said first resistor and said first inductor between said first input terminal and said output terminal, a detector connected to said output terminal, an oscillator, a modulator receiving inputs from said detector and said oscillator and supplying a switching signal input to said first switching means, a second resistor connected in parallel with said first resistor, a second switching means connected in series with said second inductor between said first switching means and said output terminal and connected to said second resistor.

4. A power supply circuit according to claim 3 wherein said first and second switching means are transistors.

5. A power supply circuit comprising, a DC voltage source, a pair of input terminals connected to said DC voltage source, a transformer having first and second primary series connected windings and a secondary winding, an output terminal, a rectifier means connected between one end of said secondary winding and said output terminal, a resistor connected in series with said secondary winding, first and second switching means respectively connected in series with said first and second primary windings across said pair of input terminals, first and second detectors means respectively connected to said output terminal and to said resistor, an oscillator, a modulator connected to said oscillator and receiving an input from said first detector, a flip-flop circuit receiving inputs from said oscillator and said second detector, a first AND gate receiving input from said modulator and a first input from said flip-flop circuit and supplying an output to said second switching circuit, a second AND gate receiving input from said modulator and a second input from said flip-flop circuit and supplying an output to said first switching means such that when one of said first and second switching means is on the other one is off.

6. A power supply circuit according to claim 5 wherein said first and second switching means are transistors.

7. A power supply circuit comprising, a DC voltage source, a pair of input terminals connected to said DC voltage source, a transformer having first and second primary windings and a secondary winding, an output terminal, a rectifier means connected between one end of said secondary winding and said output terminal, a resistor connected in series with said secondary winding, first and second switching means respectively connected in series with said first and second primary windings across said pair of input terminals, first and second detectors means respectively connected to said output terminal and to said resistor, an oscillator, a modulator connected to said oscillator and receiving an input from said first detector and supplying an output to said first switching circuit, a flip-flop circuit receiving inputs from said oscillator and said second detector, and a first AND gate receiving inputs from said modulator, a first input from said flip-flop circuit and supplying an output to said second switching circuit wherein said first and second primary windings are connected in parallel and when said flip-flop circuit is in one state said first and second switching means are on and current flows through both of said first and second primary windings and when said flip-flop circuit is in a second state said first switching means is on and said second switching means is off.

* * * * *